United States Patent [19]
Whitener

[11] Patent Number: 5,911,279
[45] Date of Patent: Jun. 15, 1999

[54] AUTOMATED RIPPER DEPTH ADJUSTOR APPARATUS

[76] Inventor: Harold L. Whitener, 37 Pine Grove Access, Ringgold, Ga. 30736

[21] Appl. No.: 09/162,139

[22] Filed: Sep. 29, 1998

[51] Int. Cl.$^6$ .................................................. A01B 49/02
[52] U.S. Cl. .............................................................. 172/668
[58] Field of Search ................................... 172/200, 199, 172/197, 142, 785, 684.5, 780, 781, 784, 783, 795, 799.5, 196, 485, 486, 487, 643, 668; 37/412–414, 404, 903

[56] References Cited

U.S. PATENT DOCUMENTS

| | | |
|---|---|---|
| 2,611,305 | 9/1952 | Acton . |
| 3,539,018 | 11/1970 | Sprenkel . |
| 4,046,399 | 9/1977 | Zeuner et al. . |
| 4,679,635 | 7/1987 | Fields . |
| 4,815,542 | 3/1989 | DePlazes . |
| 5,172,499 | 12/1992 | Griffin . |
| 5,366,024 | 11/1994 | Payne . |
| 5,407,014 | 4/1995 | Tranmer .................................. 172/197 |
| 5,794,714 | 8/1998 | Brown .................................. 172/799.5 |

*Primary Examiner*—Thomas B. Will
*Assistant Examiner*—Robert Pezzuto
*Attorney, Agent, or Firm*—Richard C. Litman

[57] ABSTRACT

The automated ripper depth adjustor apparatus includes a pivot tube raised above the side plates of a box scraper attached to the three-point hitch of a tractor and extending across the width of the box scraper. The shanks of each ripper are connected to the pivot tube by articulated arms to that the rippers are able to slide vertically in slots defined in the front box beam of the scraper in response to rotational movement of the pivot tube. A tie rod pivotally attached to the pivot tube may be activated by the operator of the tractor from the seat of the tractor, in one embodiment by a mechanical lever, in a second embodiment by a hydraulic piston and cylinder arrangement, and in a third embodiment by an electrical gear motor. In the embodiment with the mechanical lever, a pair of springs attached to the top edge of the back wall of the scraper by spring support arms attached to the pivot tube bias the rippers in a normally up position and assist movement of the lever.

14 Claims, 9 Drawing Sheets

AUTOMATED RIPPER DEPTH ADJUSTOR APPARATUS

BACKGROUND OF THE INVENTION

1. Field of the Invention

The present invention relates to landscaping implements and tractor towed implements, and particularly to an automated ripper depth adjustment apparatus which automates the process of adjusting the depth of the ripper on a box scraper, adjusting the depth of all shanks simultaneously.

2. Description of the Related Art

The box scraper is a device commonly used in landscaping for leveling and grading soil. The box scraper may be mounted on the three point hitch of a tractor and used for backfilling and grading during building construction. It may also be used for plowing or breaking soil for agricultural applications. The box scraper usually includes four to six rippers or scarifiers. While the scraper may be raised and lowered as a unit, one of the problems with the conventional box scraper is that ordinarily the depth of the rippers has to be adjusted manually by removing a pin from the shank of the ripper, raising or lowering the height of the ripper, aligning a hole in the shank of the ripper with holes in the frame of the box scraper, reinserting the pin, and locking the pin. Consequently when the tractor operator wishes to adjust the depth of the rippers, he must stop the tractor, get off and move to the rear of the tractor, manually adjust the depth of up to six rippers, and remount the tractor. The process is tedious, physically wearing, and occasionally hazardous.

It is therefore desirable to have an automated apparatus for adjusting the depth of all the rippers simultaneously. U.S. Pat. No. 2,611,305, issued Sep. 23, 1952 to R. D. Acton, teaches a device for controlling the depth of tractor towed implements and generally teaches a complicated device which includes a ground engaging gauge wheel to control the depth operated by a hand crank with an intervening mechanism including a lever attached to a reciprocating plunger in a cylinder guide, attached to a flexible power transmitting element inside a flexible housing, attached to a screw jack mechanism reciprocating in a guide. While the Acton patent teaches a device which will raise or lower the depth of an entire implement, it does not teach a device which will raise or lower the depth of a ripper shank supported within the implement while maintaining the same depth for the frame.

U.S. Pat. No. 3,539,018, issued Nov. 10, 1970 to R. L. Sprenkel, describes a device which includes rippers fixedly attached to a box beam, the box beam being pivotally attached to a bottom link, the bottom link being fixedly attached to a plate. Hydraulic cylinders raise and lower the plate in order to raise and lower the entire apparatus, while another set of hydraulic cylinders raise and lower the box beam to adjust the angle of attack of the rippers. In the Sprenkel device, the depth of the rippers with respect to the box beam is not adjustable.

U.S. Pat. No. 4,679,635, issued Jul. 14, 1987 to E. L. Fields, shows a tilling device with rippers which is raised and lowered by a winch and cable. Each ripper blade is kept biased against a set screw by a hydraulic cylinder and piston in order to maintain a uniform depth of tilling. The depth is adjusted manually by setting a set screw for each ripper.

U.S. Pat. No. 5,366,024, issued Nov. 22, 1994 to D. A. Payne, discloses a device for accurately setting repeatable depths of a tractor towed implement. A hydraulic cylinder controls raising a lowering the implement. As the cylinder extends, a link causes an operating member to contact a poppet valve on a hydraulic valve which controls the cylinder in order to prevent further extension of the cylinder. The operating member has a depth gauge and a hand crank to preset the depth of the implement. The Payne patent does not disclose a device for controlling the depth of ripper blades while maintaining the same frame depth.

Other, less relevant patents showing improvements to box scrapers and tractor hydraulic systems include U.S. Pat. No. 4,046,399, issued Sep. 6, 1977 to Zeuner, et al., U.S. Pat. No. 4,815,542, issued Mar. 28, 1989 to R. J. DePlazes, and U.S. Pat. No. 5,172,499, issued Dec. 22, 1992 to J. Griffin. The Zeuner patent describes an apparatus for permitting hydraulic control of a towed implement from the cab of a tractor without routing hydraulic lines into the cab by installing an electro-hydraulic valve on the towed implement, a hydraulic supply and drain connected between the tractor and the electro-hydraulic valve, and an electric switch in the cab. The DePlazes patent teaches an improvement to a box scraper for fine leveling of the ground surface by placing a U-shaped channel behind the bottom edge of the scraper blade. The Griffin patent shows a combined box scraper-loader in which a pivoting bottom wall of a loader may be detached for use of the implement as a scraper.

None of the above inventions and patents, taken either singularly or in combination, is seen to describe the instant invention as claimed. In particular, none of the above inventions and patents are seen to describe an apparatus which raises and lowers ripper blades within the frame of a towed implement simultaneously by use of an automated lever. Thus a automated ripper raiser for tractors solving the aforementioned problems is desired.

SUMMARY OF THE INVENTION

The automated ripper depth adjustor apparatus includes a pivot tube raised above the side plates of a box scraper attached to the three-point hitch of a tractor and extending across the width of the box scraper. The shanks of each ripper are connected to the pivot tube by articulated arms to that the rippers are able to slide vertically in slots defined in the front box beam of the scraper in response to rotational movement of the pivot tube. A tie rod pivotally attached to the pivot tube may be activated by the operator of the tractor from the seat of the tractor, in one embodiment by a mechanical lever, in a second embodiment by a hydraulic piston and cylinder arrangement, and in a third embodiment by an electrical gear motor. In the embodiment with the mechanical lever, a pair of springs attached to the top edge of the back wall of the scraper by spring support arms attached to the pivot tube bias the rippers in a normally up position and assist movement of the lever.

Accordingly, it is a principal object of the invention to provide an apparatus which automates the process of adjusting the depth of the rippers in a box scraper so that the depth of the rippers may be controlled by the operator of a tractor towing the box scraper using a lever or switch operated from the seat of the tractor without the necessity of manually adjusting the depth of each ripper.

It is another object of the invention to provide an apparatus for adjusting the depth of the rippers of a box scraper which may be operated by a lever mechanically linked to a pivot tube which raises and lowers the rippers by articulated arms linking the pivot tube with the shanks of the rippers.

It is a further object of the invention to provide an apparatus for adjusting the depth of the rippers of a box scraper which may be operated by a lever operating a hydraulic cylinder and piston linked to a pivot tube which raises and lowers the rippers by articulated arms linking the pivot tube with the shanks of the rippers.

Still another object of the invention is to provide an apparatus for adjusting the depth of the rippers of a box scraper which may be operated by a switch operating an electrical gear motor linked to a pivot tube which raises and lowers the rippers by articulated arms linking the pivot tube with the shanks of the rippers.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
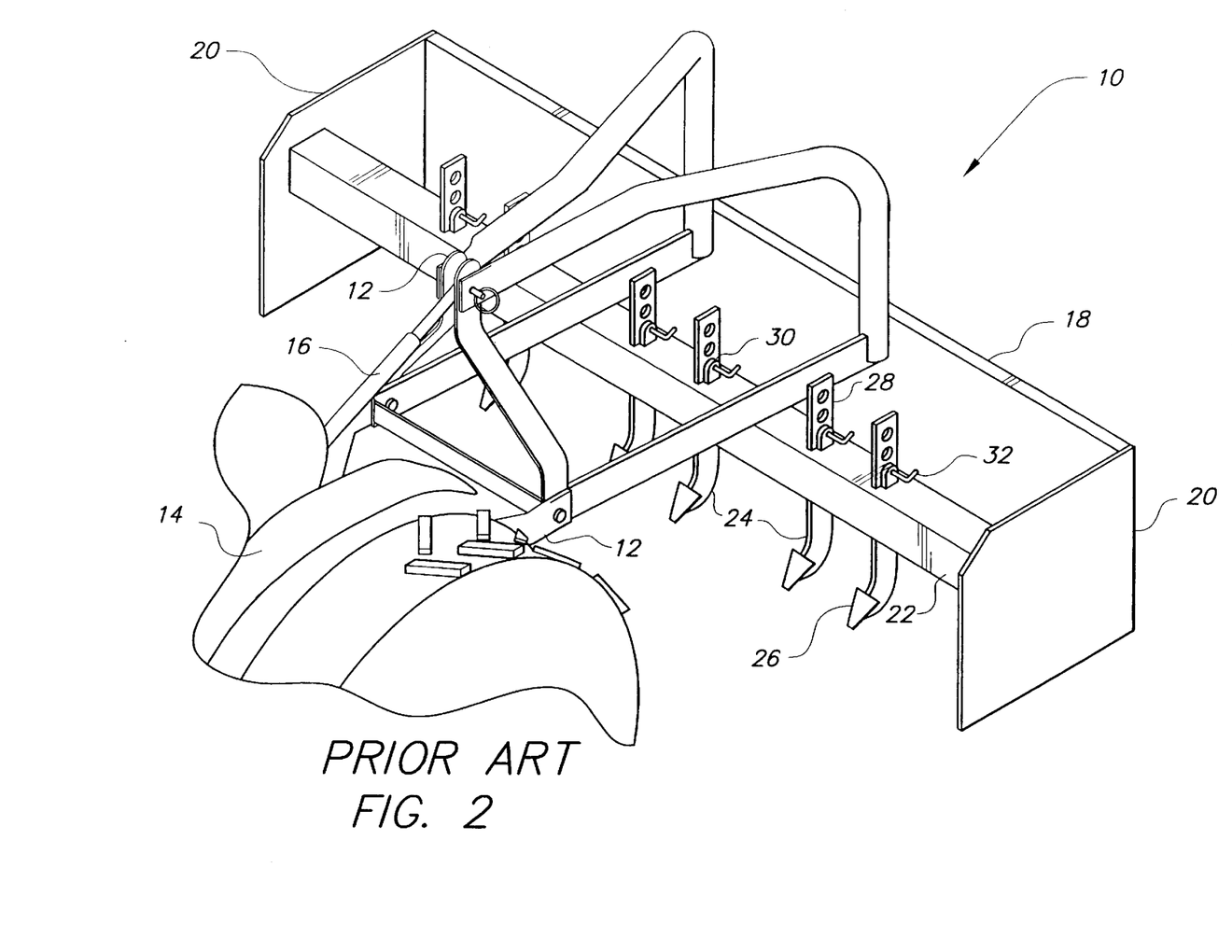
FIG. 2 is an environmental perspective view of a box scraper according to the prior art.

The present invention is an automated depth adjustor apparatus for use with a box scraper or other implement towed by a tractor. A box scraper 10 as known in the prior art is shown in FIG. 2. The box scraper 10 is attached to the three-point hitch 12 of a tractor 14. A hydraulic cylinder 16, winch, or other means raises and lowers the entire box apparatus 10 from the ground. The scraper 10 includes a back wall 18, a pair of side walls 20, and a hollow box beam 22, generally describing a box shape. The bottom edge of the back wall 18 includes a scraper (not shown). The box beam 22 supports a number of blades, usually four to six in number, variously referred to as rippers 24 of scarifiers. The rippers 24 are a flat blade having a pointed tip end 26 adapted for penetrating the ground, and a shank portion 28 having a plurality of holes. In the conventional box scraper 10, the depth of the rippers 24 is adjusted by sliding the shank 28 of the ripper 24 in a slot defined in the box beam 22 in order to register the hole in the shank 28 with the holes in a bracket 30 integral with the box beam 22 and inserting a retainer pin 32 to secure the ripper 24 blade.

The depth of each ripper 24 must be adjusted manually. The process is time consuming and physically wearing. It also frequently results in the operator of the scraper 10 sustaining cuts, scrapes, bumps and bruises as he manipulates the blades. The present invention presents an apparatus for simultaneously adjusting the depth of all of the ripper 24 blades.

Figure 1:
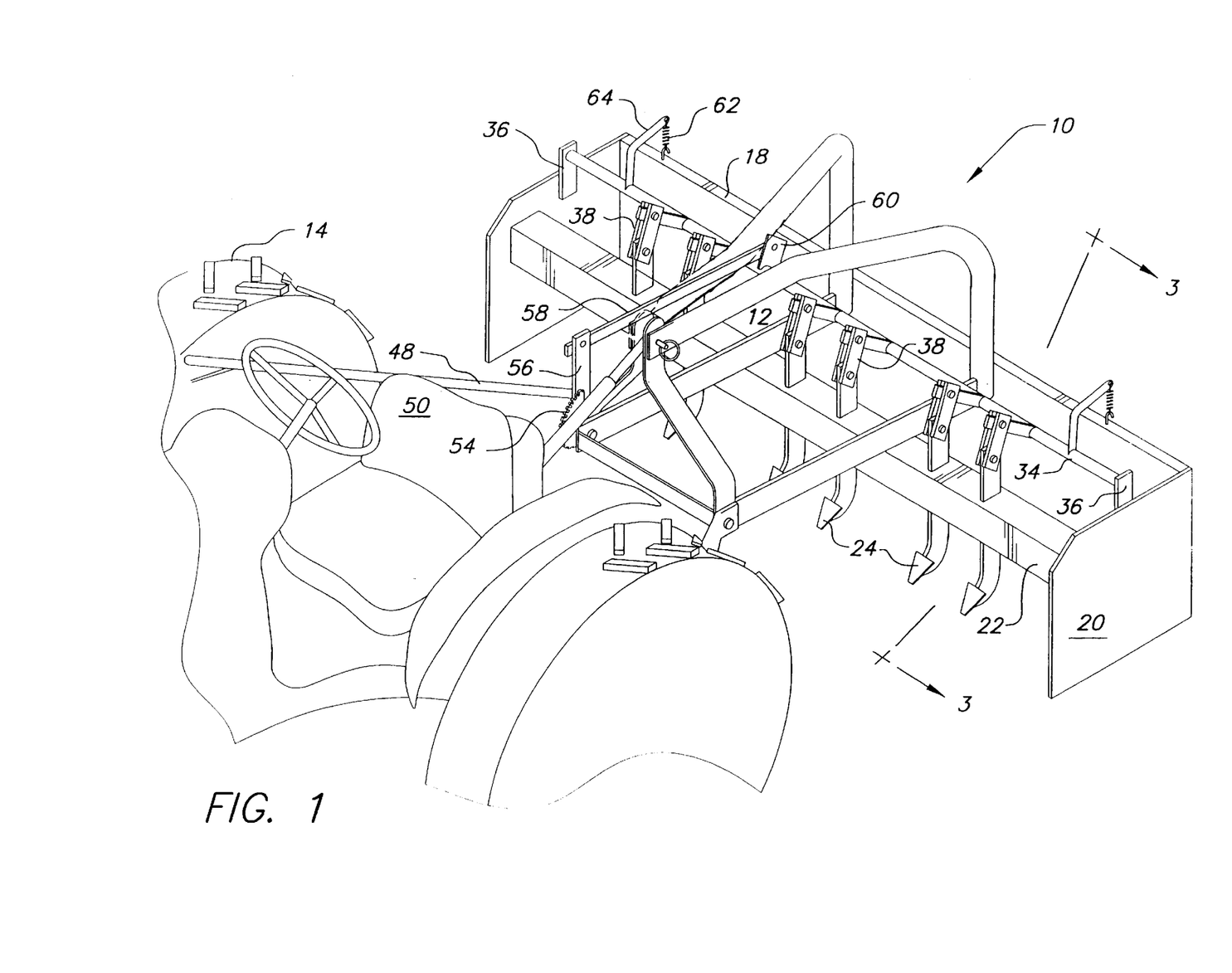
FIG. 1 is an environmental, perspective view of a automated ripper depth adjustor apparatus according to the present invention.
Figure 3:
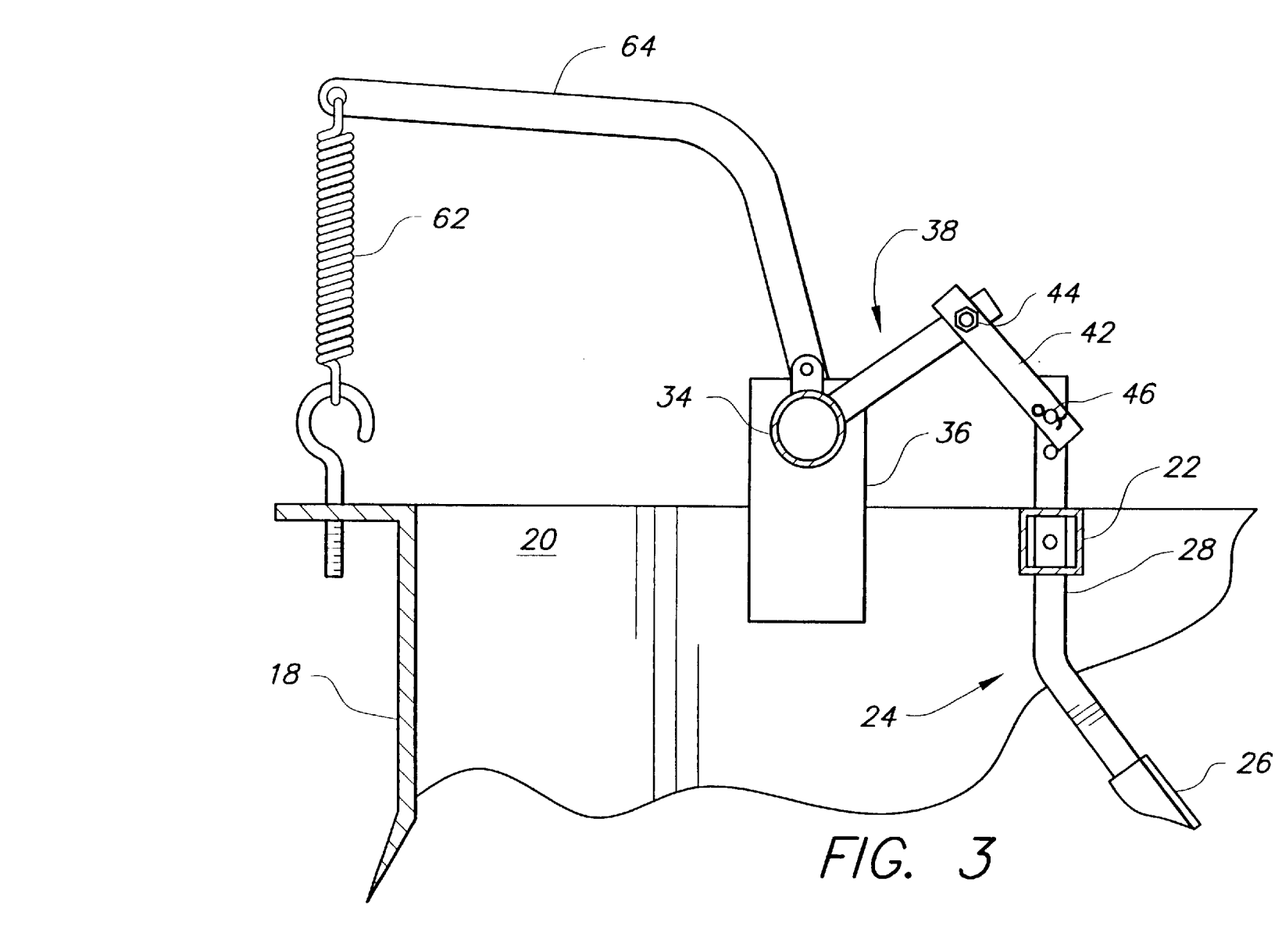
FIG. 3 is a section view along the line 3—3 of FIG. 1 showing the articulated arms attached to the rippers according to the present invention.
Figure 4:
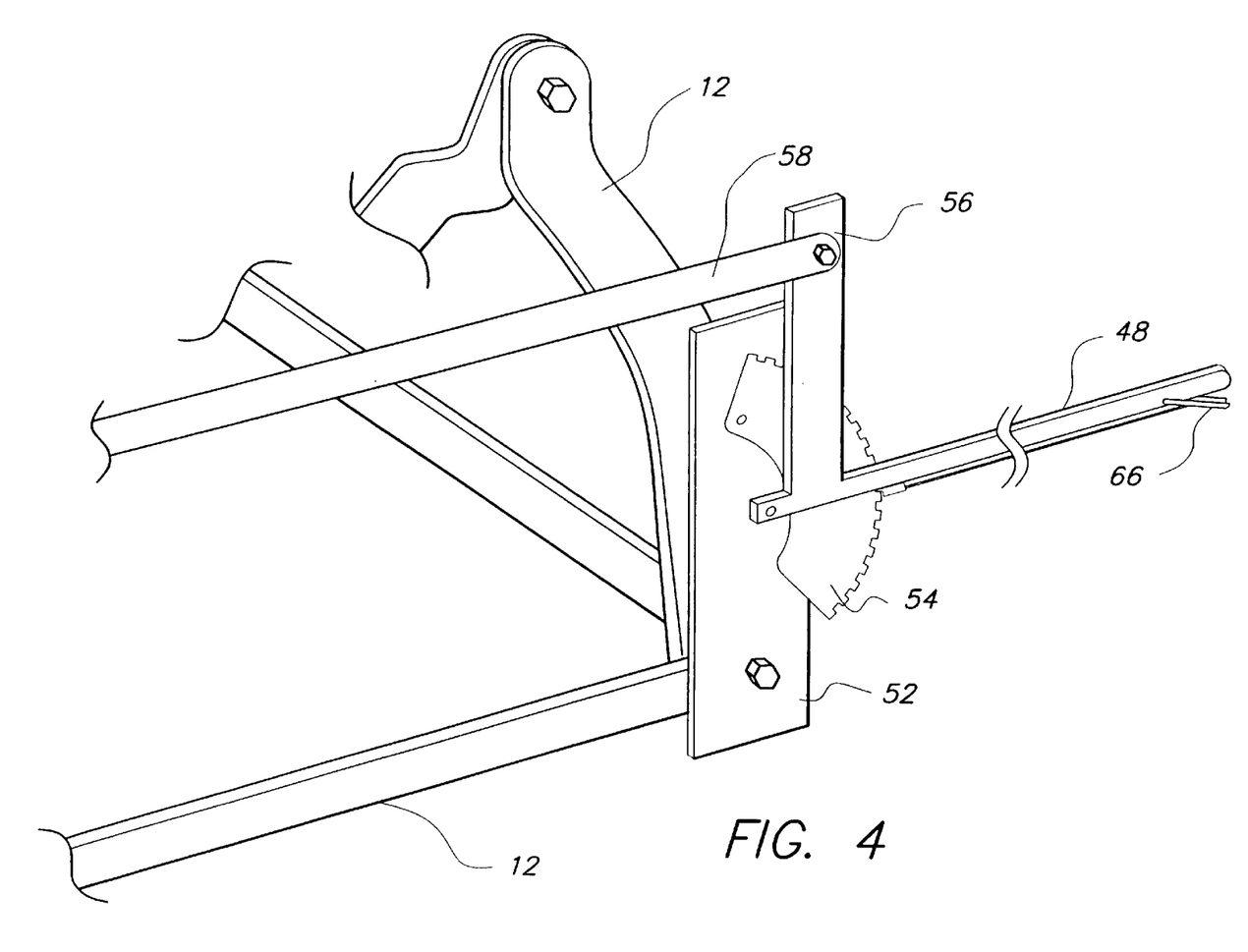
FIG. 4 is a lateral perspective view with parts omitted to show the mechanical lever of the first embodiment of the automated ripper depth adjustor apparatus of the present invention.
Figure 5:
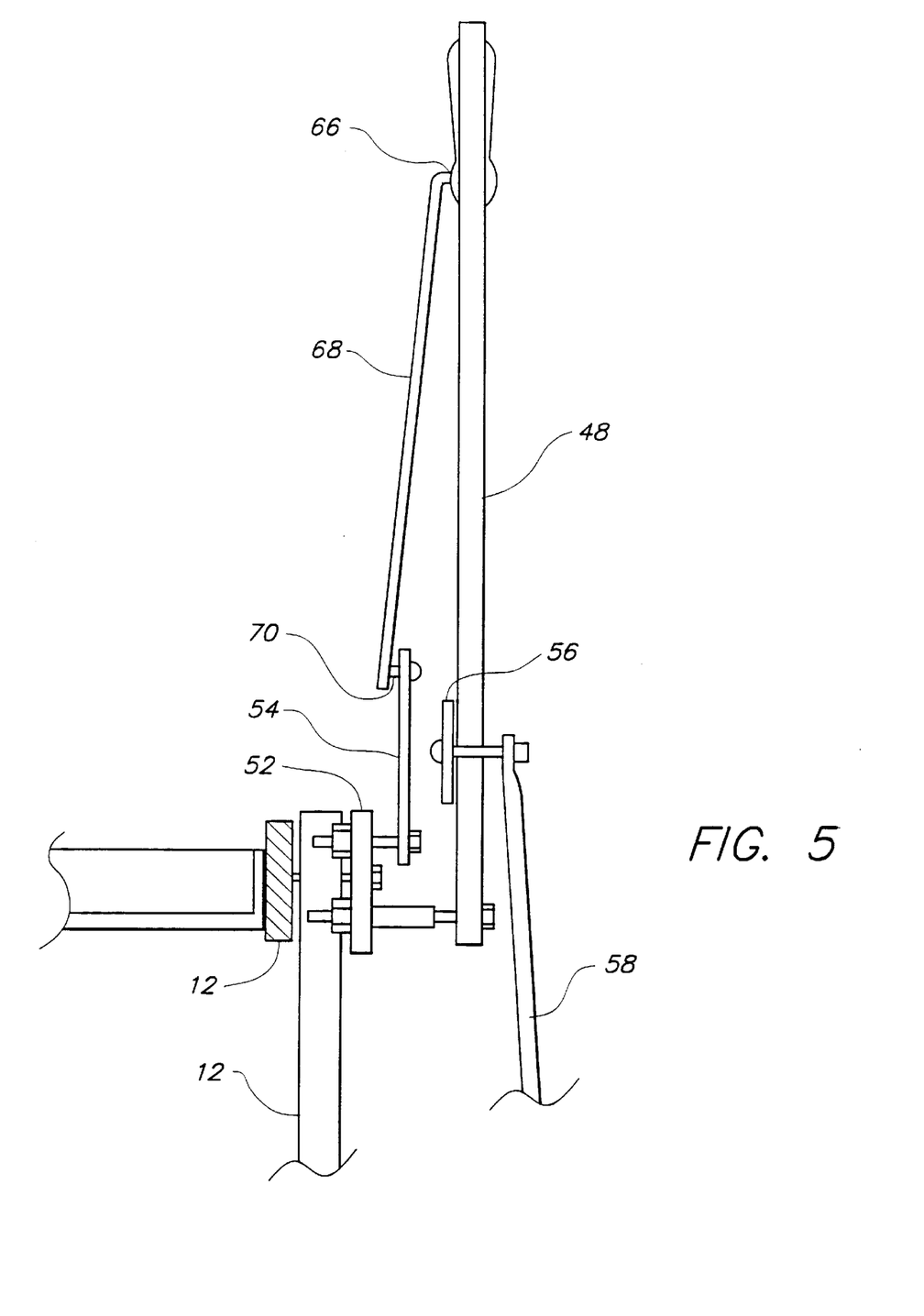
FIG. 5 is a plan view, partly in section, of the mechanical lever of the automated ripper depth adjustor apparatus of the present invention.

As shown in FIG. 1, the automated ripper depth adjustor apparatus includes a pivot tube 34 extending above the box scraper 10 and between its side walls 20, pivotally mounted in a plurality of tube support brackets 36. As best shown in FIG. 3, each of the rippers 24 is attached to the pivot tube 34 by an articulated arm 38. The articulated arm 38 has a shoulder plate 40 welded to the pivot tube 34. The shoulder plate 40 is pivotally attached to a pair of parallel elbow plates 42 on either side of the shoulder plate 40 by a pivot pin 44. The elbow plates 42 are pivotally attached to the shank 28 of the ripper 24 by a second pivot pin 46. The shank 28 of the ripper 24 is freely slidable within a slot defined in the box beam 22. It will be seen that this structure results in each of the rippers 24 being simultaneously raised or lowered by rotation of the pivot tube 34. In the first embodiment of the apparatus, rotation of the pivot tube 34 is controlled by a mechanical lever 48 which extends from the rear of the tractor 14 to the area beside the tractor seat 50. With reference to FIGS. 1, 4, and 5, a stationary mounting plate 52 is attached to the bottom leg of the three-point hitch 12. A sprocket wheel 54 is fixedly attached to the mounting plate 52. An extended mechanical lever arm 48 is pivotally mounted to the mounting plate 52. A link plate 56 is welded to the mechanical lever arm 48, substantially at a right angle. A tie rod 58 is pivotally attached to the link plate 56 at one end and pivotally attached at the other end to a tie rod plate 60 which is fixedly attached to the pivot tube 34. Thus, as the mechanical lever arm 48 is rotated, the pivot tube 34 rotates to raise and lower the rippers 24.

As shown in FIG. 1, a pair of tension springs 62 are mounted between the top edge of the back wall 18 of the box scraper 10 and a pair of spring support arms 64 attached to the pivot tube 34. The springs 62 bias the lever 48 to maintain the rippers 24 in a normally up position, in which the springs are relaxed. As the lever 48 is rotated to pull the rippers 24 down, the springs 62 are stretched from the tension applied by the spring support arms 64. When the lever 48 is released, the springs 62 pull back towards their normally relaxed position, helping to raise the rippers 24 and make movement of the lever 48 smoother and easier.

The mechanical lever arm 48 also includes a brake lever 66 attached to the end of the lever arm 48 next to the tractor seat 50. The brake lever 66 includes a rod 68, cable, or other means attached to the mechanical lever arm 48 which is spring biased in order to extend a stop pin 70 which engages the teeth of the sprocket wheel 54 when the brake lever 66 is released. When the brake lever 66 is squeezed or compressed to a closed position, the stop pin 70 is retracted from between the teeth of the sprocket wheel 54, permitting rotation of the mechanical lever arm 48. After the mechanical lever arm 48 has been rotated to the desired ripper 24 depth, the brake lever 66 is released to an open position in order to extend the stop pin 70 into engagement with the teeth of the sprocket wheel 54, preventing further rotation of the lever arm 48 and locking the depth of the rippers 24.

Figure 6:
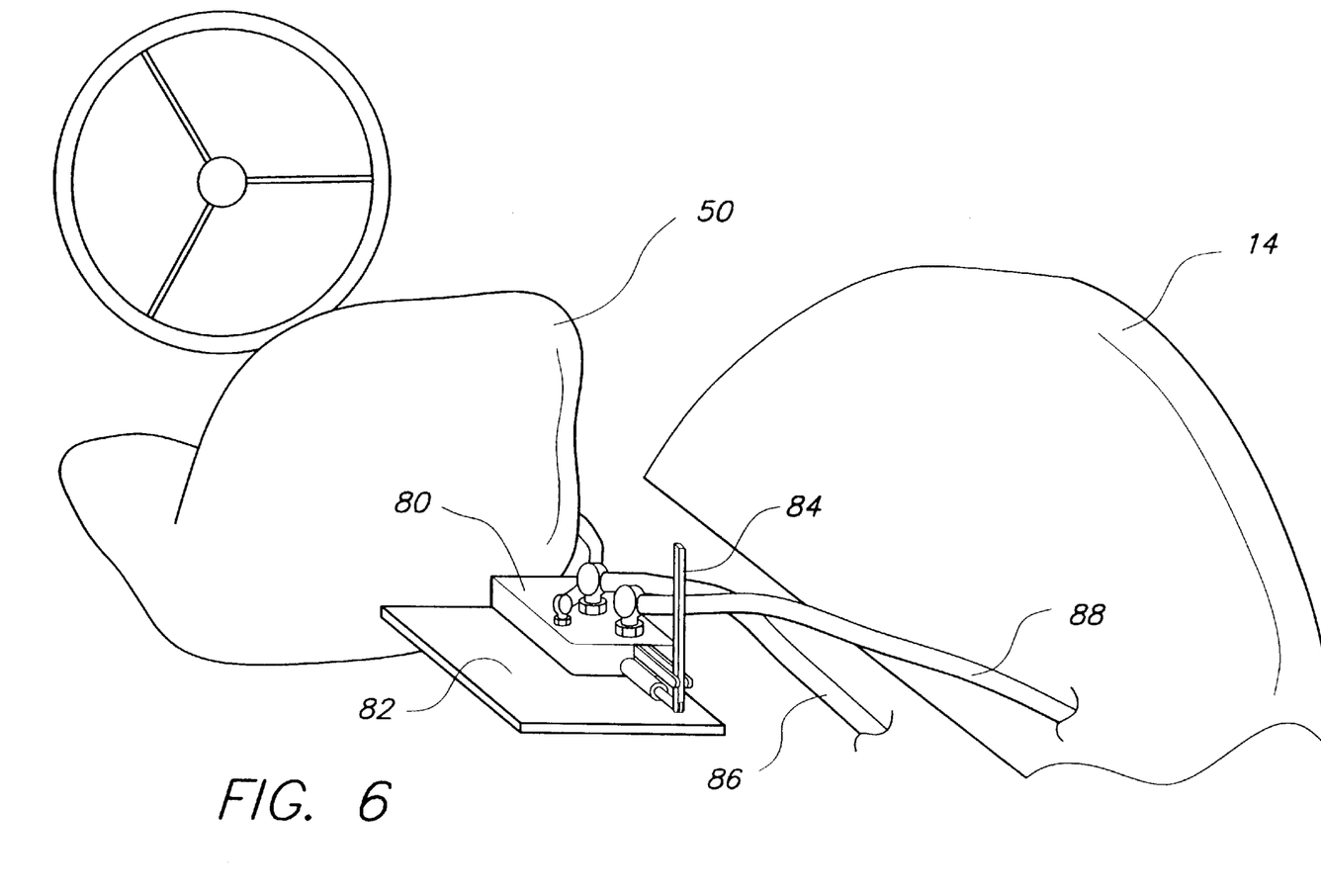
FIG. 6 is a top, perspective view of a hydraulic valve and lever of a second embodiment of the automated ripper depth adjustor apparatus according to the present invention.
Figure 7:
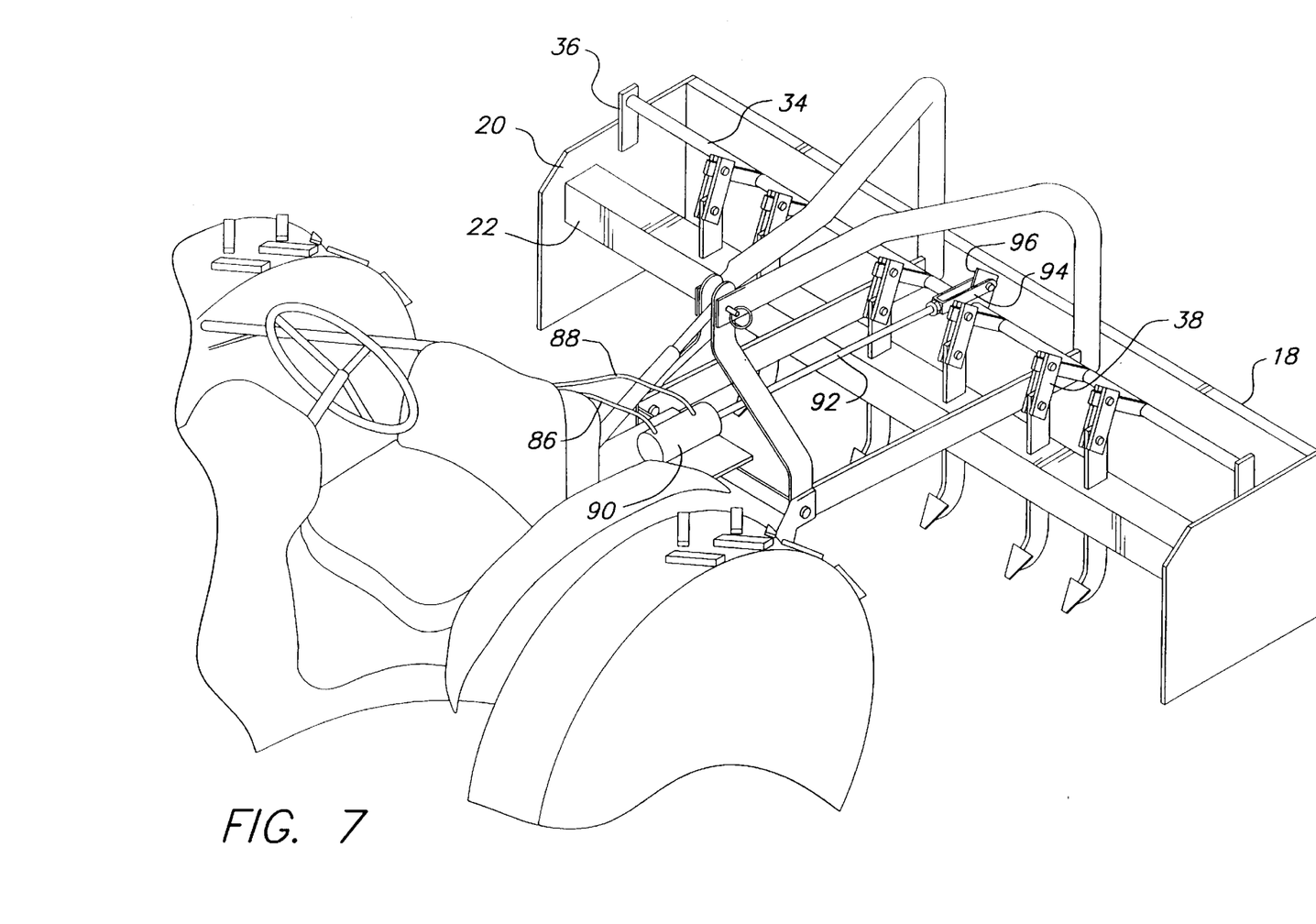
FIG. 7 is a top, perspective view a hydraulic cylinder actuating mechanism of the second embodiment of the automated ripper depth adjustor apparatus according to the present invention.

Instead of a mechanical lever arm 48, the second embodiment of the automated ripper depth adjustment apparatus uses hydraulic means to control operation of the apparatus. As shown in FIGS. 6 and 7, the apparatus includes a hydraulic valve 80 mounted in a location convenient to the operator of the tractor 14, such as on a platform 82 immediately behind the tractor seat 50. The valve 80 is tapped into the existing hydraulic system, whether original equipment or a retrofitted system, of the tractor 14 in order to utilize its pump and hydraulic reservoir (not shown). The valve 80 is operated by a lever 84 and has a hydraulic supply hose 86 and drain hose 88 leaving and entering the valve 80.

The supply hose 86 and drain hose 88 are connected to a hydraulic cylinder 90 mounted along the longitudinal axis of the tractor 14. The piston rod 92 of the hydraulic cylinder 90 is connected to a U-shaped yoke linkage 94, which is pivotally connected to a tie rod support 96 fixedly connected with the pivot, tube 34 in such a manner that the tie rod support 96 is located in a plane bisecting the pivot tube 34. In operation, the operator of the tractor 14 rotates the hydraulic lever 84, the direction of rotation causing either raising or lowering of the rippers 24 respectively. The valve 80 supplies hydraulic fluid to one side of the piston and drains it from the other side in order to move the piston rod 92 either forwards of backwards along the longitudinal axis of the tractor 14, resulting in rotation of the pivot tube 34 as the linkage 94 pivots on the tie rod support 96. The operator stops rotation of the hydraulic lever 84 when the rippers 24 are at the desired depth. Since rotation of the pivot tube 34 is power assisted, the bias springs 62 are unnecessary in the second embodiment of the apparatus.

Figure 8:
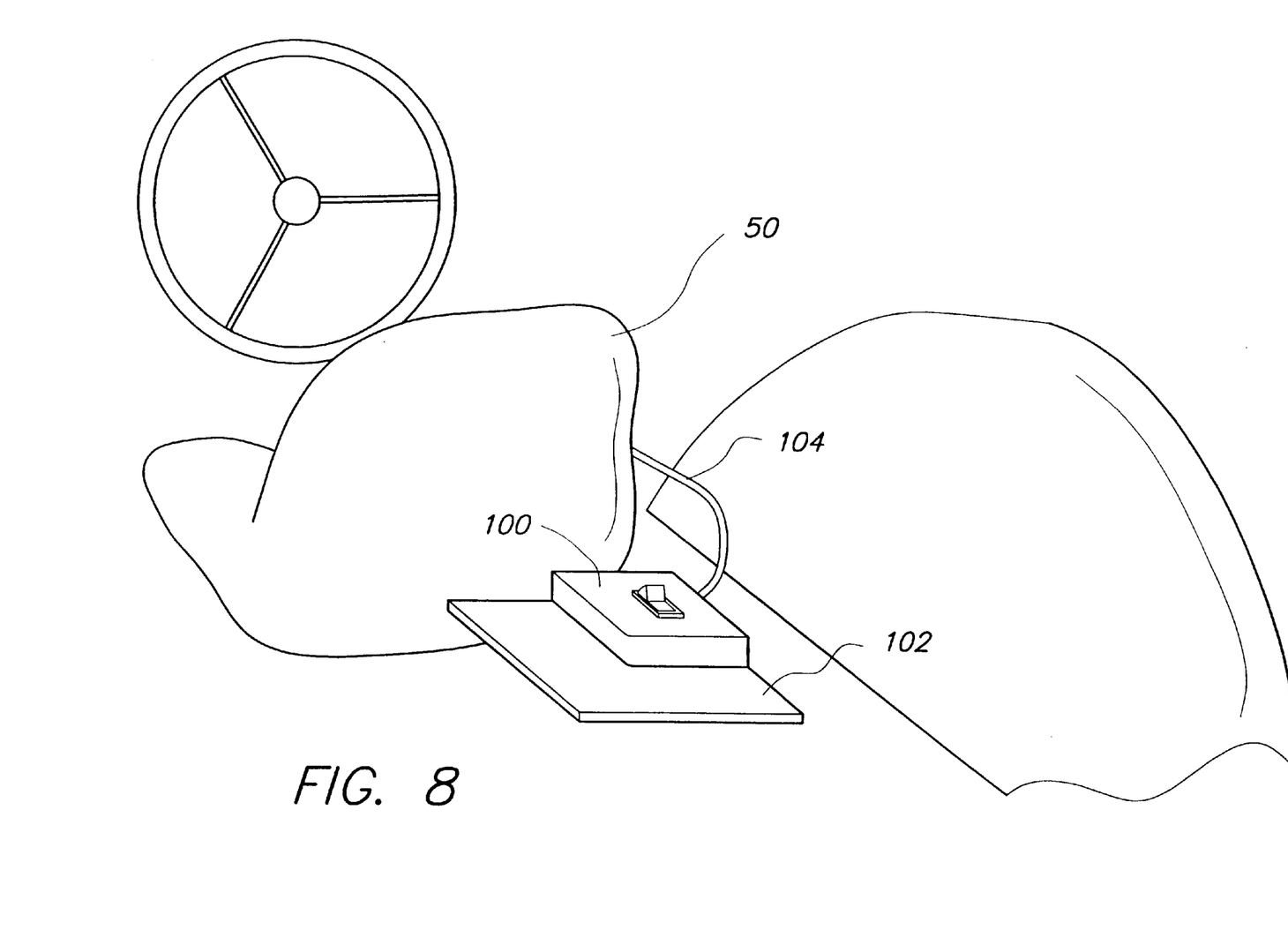
FIG. 8 is a top, perspective view showing an electrical switch of a third embodiment of the automated ripper depth adjustor apparatus according to the present invention.
Figure 9:
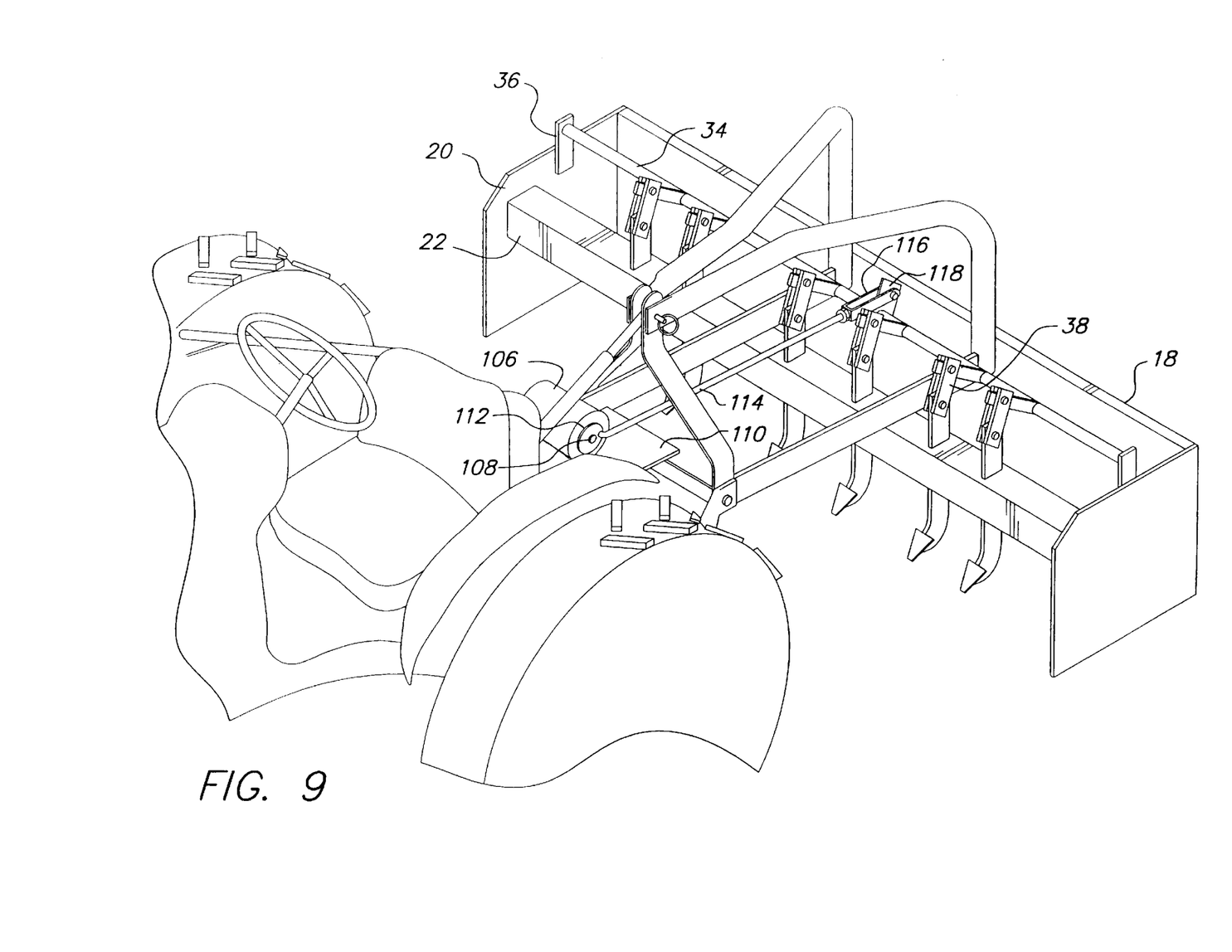
FIG. 9 is a top, perspective view of an electric motor actuating mechanism of the automated ripper depth adjustor apparatus according to the present invention.

FIGS. 8 and 9 show a third embodiment of the actuating element of the automated ripper depth adjustment apparatus. Instead of a mechanical actuating structure or a hydraulic actuating structure, the depth adjustor may be actuated by an electric motor. In the third embodiment, the operator may adjust the depth of the rippers by using an electrical switch within reach of the tractor seat. FIG. 8 shows a electrical switch 100 mounted on a platform 102 at the rear of the tractor seat 50, connected by appropriate wiring 104 to a power source in the tractor's 14 existing electrical system (not shown), and to an electric motor 106 (shown in FIG. 9) mounted at the rear of the tractor 14. The switch 100 may be at rotary switch, a lever switch, a normally open three-pole rocker switch, or any other appropriate switch which has an off position, a forward position to rotate the shaft 108 of the electric motor 106 in one direction, and a reverse position to rotate the shaft 108 of the electric motor 106 in the opposite direction in order to either raise or lower the rippers 24. Although shown behind the tractor seat 50, the switch 100 may be placed at any location conveniently within the reach of the operator of the tractor 14.

The electric motor 106 is a high torque gear motor mounted on a platform 110 at the rear of the tractor 18. The motor 106 may be coupled to the pivot tube 34 by any conventionally known means for translating the rotational motion of the motor 106 into rotational movement of the pivot tube 34. FIG. 9 shows a motor 106 mounted transversely to the longitudinal axis of the tractor 14. The shaft 108 of the motor 106 has a disk 112 mounted thereon in a plane parallel to the longitudinal axis of the tractor 14. A tie rod 114 is attached to the periphery of the disk 112. The tie rod 114 extends parallel to the longitudinal axis of the tractor 14, its opposite end being connected to a U-shaped yoke linkage 116, which is pivotally attached to a tie rod support 118 fixedly connected with the pivot tube 34 in such a manner that the tie rod support 118 is located in a plane bisecting the pivot tube 34. The tie rod 114 may be attached to the disk 112 at a fixed radial distance from the center of the disk 112, but is preferably attached by a bolt or pin slidably mounted in an arcuate slot whose radial distance from the center of the disk 112 increases as the disk 112 rotates through a 90° angle in order to maintain the tie rod 114 horizontally level. Other means for coupling the motor 106 to the pivot tube 34 are known and well within the competence of those skilled in the art.

In use, the operator of the tractor 14 moves the switch 100 to either the forward or the reverse position to raise or lower the rippers 24. The rotary motion of the shaft 108 of the motor 106 is translated to a pulling or pushing movement of the tie rod 114 in either a forward or backwards direction along the longitudinal axis of the tractor 14, the pivotal connection to the tie rod support 118 resulting in rotation of the pivot tube 34, and consequently adjusting the depth of the rippers 24.

It will be obvious that although the automated ripper depth adjustor apparatus has been described with reference to a box scraper, the apparatus may also be adapted for use with any other implement towed by a tractor and having rippers.

It is to be understood that the present invention is not limited to the embodiments described above, but encompasses any and all embodiments within the scope of the following claims.

I claim:

1. An automated ripper depth adjustor apparatus for adjusting the depth of rippers on a box scraper towed by a tractor having a hydraulic system and an electrical system, the box scraper having a back wall and a box beam extending between a pair of side walls in order to define a box shape, the box beam having a plurality of slots defined therein, the box scraper further having a plurality of rippers having a shank and a pointed tip end for penetrating and scarring the ground, the automated ripper depth adjustor apparatus comprising:
   a) a plurality of pivot tube supports adapted for being fixedly attached to the box scraper;
   b) a pivot tube rotatably mounted in said pivot tube supports;
   c) a plurality of articulated arms, comprising a shoulder plate fixedly attached to said pivot tube, and at least one elbow plate pivotally attached to the shoulder plate and adapted for being pivotally attached to the shanks of the rippers of the box scraper, whereby rotation of said pivot tubes causes said articulated arms to raise and lower the depth of the rippers; and
   d) actuating means for rotating said pivot tube.

2. The automated ripper depth adjustor apparatus according to claim 1, wherein said actuating means comprises:
   a) a hydraulic valve having a lever for controlling the flow of hydraulic fluid, the valve being adapted for mounting in a position wherein the lever is accessible to an operator of the tractor from a tractor seat;
   b) a hydraulic cylinder having a piston rod reciprocating in said cylinder in response to changes in hydraulic pressure within said cylinder;
   c) a plurality of flexible hoses connecting said hydraulic valve with said hydraulic cylinder;
   d) a tie rod support fixedly attached to said pivot tube;
   e) linkage means for pivotally attaching the piston rod of said hydraulic cylinder to said tie rod support, whereby reciprocation of the piston rod causes rotation of said pivot tube.

3. The automated ripper depth adjustor apparatus according to claim 2, wherein said plurality of hoses includes a supply hose and a drain hose.

4. The automated ripper depth adjustor apparatus according to claim 2, wherein said linkage means comprises a U-shaped yoke linkage attached to the piston rod of said hydraulic cylinder and pivotally attached to said tie rod support.

5. The automated ripper depth adjustor apparatus according to claim 2, wherein said tie rod support is disposed within a plane bisecting said pivot tube.

6. The automated ripper depth adjustor apparatus according to claim 1, wherein said actuating means comprises:

a) an electrical switch electrically connected to the electrical system of the tractor, the switch being readily accessible to an operator of the tractor from a tractor seat;

b) an electric motor having a rotatable shaft electrically connected to said electrical switch, the switch controlling rotation of the shaft of said electric motor;

c) a tie rod support fixedly attached to said pivot tube; and d) linkage means for pivotally connecting said tie rod support to the shaft of said electric motor in order to translate rotation of the shaft of said electric motor into rotation of said pivot tube.

7. The automated ripper depth adjustor apparatus according to claim 6, wherein the direction of rotation of the shaft of said electric motor is reversible, the direction of rotation being controlled by said electric switch.

8. The automated ripper depth adjustor apparatus according to claim 6, wherein said linkage means comprises a disk attached to the shaft of said electric motor and a tie rod attached to the periphery of said disk and pivotally attached to said tie rod support.

9. The automated ripper depth adjustor apparatus according to claim 6, wherein said tie rod support is disposed in a plane bisecting said pivot tube.

10. The automated ripper depth adjustor apparatus according to claim 1, wherein said actuating means comprises:

a) a mounting plate attached to the tractor;

b) a sprocket wheel having a plurality of teeth, the sprocket wheel being fixedly attached to said mounting plate;

c) a mechanical lever arm pivotally attached to said mounting plate, the lever arm being accessible by an operator of the tractor from a tractor seat;

d) a tie rod support fixedly attached to said pivot tube; and e) linkage means for pivotally connecting said tie rod support to said mechanical lever arm in order to translate rotational movement of said mechanical lever arm into rotational movement of said pivot tube.

11. The automated ripper depth adjustor apparatus according to claim 10, wherein said mechanical lever arm comprises a link plate fixedly attached to said mechanical lever arm and wherein said linkage means comprises a tie rod pivotally attached to said tie rod support and pivotally attached to said link plate.

12. The automated ripper depth adjustor apparatus according to claim 10, further comprising a pair of spring support arms fixedly attached to said pivot tube and a pair of springs attached to said spring support arms and adapted for attachment to the back wall of the box scraper, said springs biasing the rippers in a normally up position.

13. The automated ripper depth adjustor apparatus according to claim 10, further comprising braking means for locking said mechanical lever arm in position in order to prevent rotation of said mechanical lever arm and alteration of the depth of the rippers.

14. The automated ripper depth adjustor apparatus according to claim 13, wherein said braking means comprises:

a) a brake lever attached to said mechanical lever arm, said brake lever being accessible to an operator of the tractor from a tractor seat and having a closed position and an open position;

b) a stop pin adapted for engaging the teeth of said sprocket wheel; and c) a stop pin bias means attached to said mechanical lever arm for biasing said stop pin so that said stop pin engages the teeth of said sprocket wheel in order to prevent rotation of said mechanical lever arm when said brake lever is in an open position, and so that said stop pin disengages the teeth of said sprocket wheel when said brake lever is in a closed position in order to permit rotation of said mechanical lever arm.

\* \* \* \* \*